3,112,169
RECOVERY OF CESIUM VALUES FROM POLLUCITE ORE

Cornelius E. Berthold, Trona, and James R. Kane, Stockton, Calif., assignors, by mesne assignments, to San Antonio Chemicals, Inc., a corporation of Delaware
No Drawing.  Filed Nov. 1, 1960, Ser. No. 66,429
4 Claims.  (Cl. 23—32)

This invention relates to the recovery of the cesium values as cesium alum from the cesium aluminosilicate ore, pollucite. This ore can be represented by various formulas from $Cs_4Al_4Si_9O_{26} \cdot H_2O$ to $$Cs_{16-x}Na_xAl_{16}Si_{32}O_{96} \cdot xH_2O$$

where $x$ is a number from 0 to 15. When $x$ is 16 the mineral is termed analcite. Cesium alum $$[CsAl(SO_4)_2 \cdot 12H_2O]$$

can be used as a convenient starting material for the preparation of other cesium salts.

Heretofore, it has been necessary to subject this mineral to long and severe chemical treatment to decompose it and provide the cesium value in a recoverable form. For example, processes described in Inorganic Synthesis, vol. IV, pp. 6–9, McGraw-Hill (1953), utilize approximately four times the stoichiometric amount of sulfuric or hydrochloric acid theoretically required by the alkalies and aluminum in the ore. The ore-acid solution is heated to boiling and refluxed for periods of up to 30 hours to enable a 90% recovery of the cesium contained in the ore as cesium alum or cesium aluminum chloride. Multiple leaches are also employed to increase the cesium recovery. After digesting the ore-acid mixture for the required period, one is faced with the problem of conveying, pumping, and filtering a hot, very corrosive, abrasive slurry. The demands upon materials of construction by such a combination are very severe, with the result that operating costs and maintenance requirements are both very high.

We have discovered a new and novel method of treating pollucite ore which obviates these heretofore severe treatment methods and affords a simple, economical, and relatively rapid means of recovering cesium from the ore. In addition, it eliminates the need for handling a hot, strongly acidic and very corrosive, abrasive slurry with its attendant problem.

We have found that, if a mixture of finely ground pollucite ore and the stoichiometric quantity of sulfuric acid required for reaction with the alkali metals and aluminum present in the ore be heated to a temperature of about 150° C. for a period of about four hours, and a weight of water equal to at least one-fourth the weight of the pollucite ore used be added to the ore-acid mixture during this period, substantially complete extraction of cesium values from the ore results. More than this quantity of water may be added if necessary to keep the ore-acid paste in stirrable condition, since, as the reaction progresses, the originally thin paste thickens to a very stiff, hard-to-stir paste unless water is added to restore it to a fluid consistency. Using less than the above mentioned quantity of one-fourth the ore weight of water results in a decreased recovery of cesium values from the ore. The water may be added with the acid to the powdered ore if desired or part of the water can be so added and the remainder during the acid treatment period. To ensure maximum acid-ore contact the ore is finely ground, usually to minus 200-mesh.

In arriving at the quantity of acid one can take into account the alkali metals and the aluminum present as oxides:

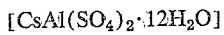

where M is any one of the alkali metals. The alkali metals and aluminum may not be present as oxides in the ore and this method of dealing with them is for simplicity; it has proven to be reliable. One must deal with the ore composition for it is the ore which must be decomposed. Pollucite, the mineral, occurs in association with other minerals. For example, a petrographic examination of Bikita pollucite ore showed the presence of albite, lepidolite and quartz in addition to pollucite.

We have found it convenient to operate the ore-acid reaction within a temperature range of about 100° C. to about 180° C. Temperatures lower than 100° C. require longer reaction times while at temperatures above about 180° C. too much water is lost from the reaction mixture, thereby necessitating frequent addition of water or operation under reflux and so increasing the cost of the reactor vessel.

The quantity of acid used has been found to be critical. In contrast to classical methods heretofore described, we have found that an excess of acid decreases the yield rather than increasing it as would be expected. We have found that about a 10% increase over the stoichiometric quantity of acid required is all that can or should be used. A 50% increase over the stoichiometric acid requirement lowers the cesium recovery by as much as 13%, all other reaction conditions being the same. If a 100% excess of acid is used, the cesium recovery is decreased by 45%, maintaining other reaction conditions the same. The practice of the invention is further illustrated by the following examples. The ores used were of the following compositions:

BIKITA POLLUCITE ORE (MINUS 200 MESH)
USED IN EXAMPLES 1, 3, 4, 5, 6–15 AND 18

|  | Percent |
|---|---|
| $Cs_2O$ | 21.8 |
| $Rb_2O$ | 0.59 |
| $K_2O$ | 1.18 |
| $Al_2O_3$ | 19.53 |
| $Na_2O$ | 2.69 |
| $Li_2O$ | 0.74 |
| $SiO_2$ | 50.16 |

MONTGARY POLLUCITE ORE (MINUS 200 MESH)
USED IN EXAMPLES 2, 16, 17, 19

| $Cs_2O$ | 28.2 |
|---|---|
| $Rb_2O$ | 0.97 |
| $K_2O$ | 0.67 |
| $Al_2O_3$ | 19.05 |
| $Na_2O$ | 1.41 |
| $Li_2O$ | 0.34 |
| $SiO_2$ | 49.26 |

Example 1

A mass of 600 grams of ground pollucite ore (21.8% $Cs_2O$) from Bikita, Southern Rhodesia, was mixed with 459 grams of commercial 96% sulfuric acid in a cast iron pot of about one liter capacity. 150 grams of water was also added to the ore acid mixture and the entire mass was stirred to mix the reactants.

The cast iron pot was placed on an electric hot plate and heated for four hours, maintaining the reaction mixture at about 120° to 140° C. The mixture was stirred periodically to insure a relatively uniform temperature throughout. An additional 100 grams of water was added during the reaction period to keep the mixture stirrable. At the end of the four-hour reaction period, the mixture was scooped out and placed in 7,000 grams of hot water, leached for about one hour at 100° C., and then filtered. The filter cake, consisting primarily of silica together with a small amount of undecomposed pollucite, was washed with hot water and the washings added to the filtrate. The filtrate was cooled to room temperature and stirred for several hours to complete the crystallization of cesium alum [$CsAl(SO_4)_2 \cdot 12H_2O$]. The alum crystals were filtered off and washed with cold water. The cesium recovery was 86.6%.

*Example 2*

The above steps of Example 1 were repeated using a pollucite ore from the Montgary Explorations Ltd. deposit, near Bernic Lake, Manitoba, using 433 grams of 96% sulfuric acid on 600 grams of ore. The cesium extraction in this run was about 95%.

*Examples 3, 4 and 5*

Three 50 gram samples of minus 200-mesh Bikita pollucite ore were placed in separate evaporating dishes and 100%, 150%, and 200% of the stoichiometric amount of sulfuric acid was added to each. The ore-acid mixtures were heated on an electric hot plate for four or more hours at about 150° C. Water was added during this period to keep each reaction mixture fluid. Following this reaction period, the evaporating dishes and their contents were placed in an oven and heated to remove acid, and then removed and cooled. The hard cake was removed and leached in boiling water, the slurry filtered, and the cake washed. Cesium alum crystallized from the filtrate upon cooling. The results shown below demonstrate the deleterious effect of an excess of sulfuric acid.

| Example No. | Stoichiometric Amount of $H_2SO_4$ Based on Alkalies and Aluminum, percent | Heating Period and Temperature | Percent $Cs_2O$ Extracted |
|---|---|---|---|
| 3 | 100 | 6 hr.—150° C | 85.6 |
| 4 | 150 | 6 hr.—150° C | 72.6 |
| 5 | 200 | 7½ hr.—150° C / 2 hr.—300° C | 40.3 |

A longer heating period was used in the last run in an attempt to boil off the excess sulfuric acid which had not reacted with the pollucite.

*Examples 6–15*

Another series of runs was carried out to investigate the need for water to be present during the reaction and the minimum reaction time required for high cesium extraction. The results are shown below.

| Example No. | Stoichiometric Amount of $H_2SO_4$ Based on Alkalies and Aluminum, percent | Bake Temperature and Time | Ratio of Weight of Water Added to Weight of Ore Used | Percent $Cs_2O$ Extracted |
|---|---|---|---|---|
| 6 | 100 | 4 hr—140° C / 2 hr—150° C | 1.2 | 89.5 |
| 7 | 100 | 4 hr—140° C / 2 hr—150° C | 1.0 | 81.9 |
| 8 | 150 | 5½ hr—140° C / 48 hr—150° C | 0.0 | 16.2 |
| 9 | 100 | 4 hr—140° C / 2 hr—150° C | 1.0 | 81.8 |
| 10 | 100 | 2 hr—140° C / 2 hr—300° C | 0.57 | 76.8 |
| 11 | 100 | 3 hr—120° C | 0.25 | 51.7 |
| 12 | 100 | 3 hr—140° C | 0.0 | 17.9 |
| 13 | 100 | 4 hr—140° C | 1.0 | 87.5 |
| 14 | 100 | 7 hr—120° C.—Water mixed in with acid and the mixture added during the 7 hr. period. | 0.5 | 85.6 |
| 15 | 100 | 4 hr—120° C | 0.41 | 86.6 |

The ore used in Examples 6–15 was Bikita pollucite ore ground to minus 200-mesh.

*Examples 16–17*

Several runs were carried out using Montgary pollucite ore ground to minus 200-mesh.

| Example No. | Stoichiometric Amount of $H_2SO_4$ Based on Alkalies and Aluminum, percent | Bake Temperature and Time | Ratio of Weight of Water Added to Weight of Ore Used | Percent $Cs_2O$ Extracted |
|---|---|---|---|---|
| 16 | 100 | 3½ hr. at 120°–180° C | 0.75 | 96.8 |
| 17 | 110 | 4 hr. at 110°–180° C | 0.75 | 95.9 |

*Examples 18–19*

For comparison, two runs were made using a dilute sulfuric acid leach of both types of pollucite ore (minus 200-mesh particle size) for four hours at boiling temperature.

| Example No. | $H_2SO_4$ Stoichiometry based on Alkalies and Aluminum, Percent | Leach Conditions Temp. | Leach Conditions Time, hr. | Percent $Cs_2O$ Extracted | Type of Ore |
|---|---|---|---|---|---|
| 18 | 100 | Boiling (about 100° C.). | 4.0 | 30.2 | Bikita Pollucite. |
| 19 | 100 | Boiling (about 100° C.). | 4 | 24.3 | Montgary Pollucite. |

A comparison of the experiments shown above with runs in which the ore-acid mixture is baked at 100° to 180° C. for four hours shows that baking with the addition of water gives a superior result.

We claim:

1. Process for producing cesium alum from cesium aluminosilicate ore comprising:

(A) reacting a stirrable pasty mixture comprising finely divided cesium aluminosilicate ore, $H_2SO_4$ and water under atmospheric pressure at an elevated temperature, said stirrable pasty mixture having a boiling point at atmospheric pressure above 120° C., for a period of less than 7 hours to convert a major portion of the cesium values in said ore to cesium alum, (B) maintaining said mixture in a stirrable pasty state throughout said conversion by adding to said mixture a weight of water equivalent to at least one fourth of the weight of said ore, (C) providing said sulfuric acid to said mixture in about the stoichiometric amount required to convert the aluminum and alkali metal values present in said ore to corresponding sulfates, and (D) recovering cesium alum from said mixture.

2. Process for producing cesium alum from cesium aluminosilicate ore comprising:

(A) reacting a stirrable pasty mixture comprising finely divided cesium aluminosilicate ore, $H_2SO_4$, and water, at a temperature between 120° C. and about 180° C. under atmospheric pressure until a major portion of the cesium values in said ore have been converted to cesium alum, (B) adding to said mixture an amount of water just sufficient to maintain said mixture in a stirrable pasty state throughout said conversion, said amount of water being at least one fourth the weight of said ore, (C) providing said sulfuric acid to said mixture in about the stoichiometric amount required to react with the aluminum and alkali metal values in said ore from which said cesium alum is produced, and (D) recovering cesium alum from said mixture.

3. Process for producing cesium alum from cesium aluminosilicate ore comprising:
  (A) reacting a stirrable pasty mixture comprised of finely divided cesium aluminosilicate ore, $H_2SO_4$ and water at a temperature between 120° C. and 180° C., under atmospheric pressure, for a period of less than about 7 hours to convert a major proportion of the cesium values in said ore to cesium alum,
  (B) adding to said mixture an amount of water just sufficient to maintain said mixture in a stirrable pasty state throughout said conversion, said amount of water being at least one fourth the weight of said ore,
  (C) providing said sulfuric acid to said mixture in about the stoichiometric amount required to react with aluminum and alkali metal values in said ore from which said cesium alum is produced, and
  (D) recovering cesium alum from said mixture.

4. Process for producing cesium alum from cesium aluminosilicate ore comprising:
  (A) reacting a stirrable pasty mixture comprising finely divided cesium aluminosilicate ore, $H_2SO_4$, and water under atmospheric pressure at an elevated temperature, said stirrable pasty mixture having a boiling point at atmospheric pressure between 120° C. and 180° C. for a period of from about 3 hours to 7 hours to convert a major proportion of the cesium values in said ore to cesium alum,
  (B) maintaining said mixture in a stirrable pasty state throughout said conversion by adding to said mixture a weight of water equivalent to at least one fourth of the weight of said ore,
  (C) providing said sulfuric acid to said mixture in about the stoichiometric amount required to react with aluminum and alkali metal values in said ore from which said cesium alum is produced, and
  (D) recovering cesium alum from said mixture.

References Cited in the file of this patent

UNITED STATES PATENTS

| | | |
|---|---|---|
| 1,804,631 | McKee | May 12, 1931 |
| 2,174,684 | Cameron | Oct. 3, 1939 |

FOREIGN PATENTS

| | | |
|---|---|---|
| 5,559 of 1902 | Great Britain | Feb. 5, 1903 |

OTHER REFERENCES

Inorganic Syntheses; vol. 4, 1953, pages 8–9, McGraw-Hill Book Co.